United States Patent
Wu

(10) Patent No.: US 11,805,519 B2
(45) Date of Patent: *Oct. 31, 2023

(54) METHOD FOR DETERMINING TRANSMISSION BANDWIDTH, DEVICE AND STORAGE MEDIUM

(71) Applicant: GUANGDONG OPPO MOBILE TELECOMMUNICATIONS CORP., LTD., Dongguan (CN)

(72) Inventor: Zuomin Wu, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/749,747

(22) Filed: May 20, 2022

(65) Prior Publication Data

US 2022/0279556 A1 Sep. 1, 2022

Related U.S. Application Data

(63) Continuation of application No. 17/392,221, filed on Aug. 2, 2021, now Pat. No. 11,412,533, which is a
(Continued)

(51) Int. Cl.
*H04W 72/04* (2023.01)
*H04W 72/1273* (2023.01)
(Continued)

(52) U.S. Cl.
CPC ............. *H04W 72/1273* (2013.01); *H04W 72/0453* (2013.01); *H04W 72/21* (2023.01); *H04W 72/23* (2023.01)

(58) Field of Classification Search
CPC ......... H04W 72/1273; H04W 72/0453; H04W 72/21; H04W 72/23; H04W 16/14;
(Continued)

(56) References Cited

U.S. PATENT DOCUMENTS

| 2018/0097678 A1 | 4/2018 | Zhou et al. |
| 2018/0255584 A1 | 9/2018 | Sun et al. |

(Continued)

FOREIGN PATENT DOCUMENTS

| CA | 3033509 A1 | 2/2018 |
| CA | 3059608 A1 | 11/2018 |

(Continued)

OTHER PUBLICATIONS

Second Office Action issued in corresponding Chinese Application No. 202110832434.8, dated May 19, 2022.
(Continued)

*Primary Examiner* — John D Blanton
(74) *Attorney, Agent, or Firm* — BAYES PLLC

(57) ABSTRACT

The embodiments of the present disclosure provide a method for determining a transmission bandwidth, a device and a storage medium. In the method, after configuring an unlicensed carrier for a terminal device, a network device performs channel detection on sub-bands on the unlicensed carrier, then determines, according to the detection result, which sub-bands are used for communication, indicates said sub-bands by means of first indication information, and then sends the first indication information to the terminal device; the terminal device determines, according to the first indication information, the sub-band on the unlicensed carrier for transmitting a downlink channel and/or downlink signal by the network device.

4 Claims, 5 Drawing Sheets

Related U.S. Application Data continuation of application No. PCT/CN2019/075297, filed on Feb. 15, 2019.

(51) Int. Cl.
*H04W 72/0453* (2023.01)
*H04W 72/21* (2023.01)
*H04W 72/23* (2023.01)

(58) Field of Classification Search
CPC ..... H04L 5/0094; H04L 1/0061; H04L 5/001; H04L 1/0023
See application file for complete search history.

(56) References Cited

U.S. PATENT DOCUMENTS

| | | | | |
|---|---|---|---|---|
| 2020/0221429 A1* | 7/2020 | Li | ........................ | H04L 5/0053 |
| 2021/0288852 A1* | 9/2021 | Jia | ..................... | H04L 27/26025 |
| 2021/0315006 A1* | 10/2021 | Zhang | ............... | H04W 72/0453 |
| 2021/0329649 A1* | 10/2021 | Wu | ................... | H04W 72/0473 |
| 2021/0329671 A1* | 10/2021 | Kim | ................. | H04W 72/0453 |

FOREIGN PATENT DOCUMENTS

| | | | |
|---|---|---|---|
| CA | 3066685 | A1 | 12/2018 |
| CN | 105704728 | A | 6/2016 |
| CN | 106375075 | A | 2/2017 |
| CN | 106788931 | A | 5/2017 |
| CN | 107079428 | A | 8/2017 |
| CN | 107733607 | A | 2/2018 |
| CN | 108029021 | A | 5/2018 |
| CN | 108289008 | A | 7/2018 |
| CN | 108811122 | A | 11/2018 |
| CN | 109286481 | A | 1/2019 |
| IN | 201727043690 | | 4/2018 |
| JP | 2012502546 | A | 1/2012 |
| WO | 2016161656 | A1 | 10/2016 |
| WO | 2018/133754 | A1 | 7/2018 |

OTHER PUBLICATIONS

Notice of Allowance issued in corresponding Chinese Application No. 202110832434.8, dated Aug. 8, 2022.
International Search Report issued in corresponding International Application No. PCT/CN2019/075297, dated Nov. 15, 2019, 38 pages.
PCT Written Opinion of the International Searching Authority issued in corresponding International Application No. PCT/CN2019/075297, dated Nov. 15, 2019, 7 pages.
Extended European Search Report issued in corresponding European Application No. 19915316.4, dated Dec. 15, 2021, 8 pages.
"Wideband operation for NR-U", Agenda item: 7.2.2 2.5, Source: Qualcomm Incorporated, 3GPP TSG RAN WG1 Meeting #AH1901, R1-1900877, Taipei, Taiwan, Jan. 21-Jan. 25, 2019, 5 pages.
"DL control information to facilitate wideband operation in NR-U", Agenda item: 7.2.2.2 5, Source: ITRI, 3GPP TSG RAN WG1 Ad-Hoc Meeting 1901, R1-1900987, Taipei, Taiwan, Jan. 21-25, 2019, 3 pages.
First Office action issued in corresponding Chinese Application No. 202110832434.8, dated Mar. 21, 2022, 24 pages.
First Office action issued in corresponding India Application No. 202117035738, dated Mar. 15,2022, 6 pages.
"Frame structure for NR unlicensed operation", Agenda Item: 7.2.2.2, Source: LG Electronics, 3GPP TSG RAN WG1 Meeting #95, R1-1812557, Spokane, USA, Nov. 12-16, 2018, 11 pages.
"On the Frame structure and Wideband operation for NR-U", Agenda item: 7.2 2.2, Source: Nokia, Nokia Shanghai Bell, 3GPP TSG RAN WG1 Meeting #94bis, R1-1810613, Chengdu, China, Oct. 8-12, 2018, 13 pages.
"On Wideband Operation for NR-U", Agenda item: 7.2.2.4 5, Source: Nokia, Nokia Shanghai Bell, 3GPP TSG RAN NG1 Meeting #94, R1-1808825, Gothenburg, Sweden, Aug. 20-24, 2018, 7 pages.
First Office Action issued in corresponding European Application No. 19915316.4, dated Sep. 9, 2022.
First Office Action issued in corresponding Japanese application No. 2021-547281, dated Dec. 20, 2022.
Summons to attend Oral Proceedings issued in corresponding European application No. 19915316.4, mailed Feb. 9, 2023.
Vivo, "Discussion on wideband operation in NR-U", R1-1900114, 3GPP TSG RAN WG1 Ad-Hoc Meeting 1901 Taipei, Jan. 21-25, 2019.
Qualcomm Incorporated, "Flexible allocation for PDSCH and PUSCH for efeMTC", R1-1807106, 3GPP TSG RAN WG1 Meeting #93 Busan, Korea, May 21-25, 2018.
Huawei et al., "Eady data transmission for eFeMTC", R1-1805978, 3GPP TSG RAN WG1 Meeting #93 Busan, Korea, May 21-25, 2018.
Panasonic, "COT structure indication", R1-1900258, 3GPP TSG-RAN WG1 Ad-Hoc Meeting 1901 Taipei, Taiwan, Jan. 21-25, 2019.

* cited by examiner

METHOD FOR DETERMINING TRANSMISSION BANDWIDTH, DEVICE AND STORAGE MEDIUM

CROSS-REFERENCE TO RELATED APPLICATION

This application is a continuation of U.S. patent application Ser. No. 17/392,221 filed on Aug. 2, 2021, which is a continuation of International Application No. PCT/CN2019/075297, filed on Feb. 15, 2019, the contents of which are incorporated herein by reference in their entireties.

BACKGROUND

The embodiments of the present disclosure relate to communication technologies, and in particular, to a method and device for determining a transmission bandwidth, and a storage medium.

In a New Radio (NR) system, a base station side supports a large bandwidth of a single carrier. Correspondingly, it also supports the large bandwidth of the single carrier in an NR-based access to unlicensed spectrum (NR-U) system. For example, the system bandwidth is 40 MHz, 60 MHz, 80 MHz, etc. Correspondingly, the configured Bandwidth Part (BWP) may also be 40 MHz, 60 MHz, 80 MHz, etc. In the unlicensed spectrum, the bandwidth for Listen Before Talk (LBT) is 20 MHz, so there may be a case where the bandwidth for which the LBT succeeds may be less than the system bandwidth or BWP bandwidth. In this case, in order to obtain as many channel transmission opportunities on the unlicensed spectrum as possible, the base station may also perform downlink transmission when only obtaining channel usage right of part of the BWP bandwidth, that is, multi-sub-band adaptive transmission in the NR-U system.

In the scenario of broadband transmission with a system carrier bandwidth greater than 20 MHz, the UE can be configured with multiple BWPs and only one BWP can be active. When the active BWP includes multiple LBT sub-bands, the base station can perform PDSCH transmission through part or all of the LBT sub-bands included in the active BWP according to channel detection results of the LBT sub-bands. The BWP configured by the base station for User Equipment (UE) includes two sub-bands, a first sub-band and a second sub-band. The base station plans to transmit Physical Downlink Shared Channel (PDSCH) to the UE by scheduling the first sub-band and the second sub-band. However, when channel detection is performed on each LBT sub-band, the LBT on the first sub-band succeeds, and the LTB on the second sub-band fails, and thus the base station transmits the PDSCH to the UE through the first sub-band included in BWP #0.

Although the downlink multi-sub-band adaptive transmission in the NR-U system is supported in the above solution, as for the UE, the LBT sub-band included in the configured and activated BWP is signaled to the UE in advance through Radio Resource Control (RRC) signaling, the actual LBT sub-band that can be used for PDSCH transmission in the active BWP can only be determined by the base station after completion of the LBT.

SUMMARY

Embodiments of the present disclosure provide a method and device for determining transmission bandwidth, and a storage medium.

In a first aspect, embodiments of the present disclosure can provide a method for determining a transmission bandwidth, and the method includes receiving, by a terminal device, first indication information sent by a network device, the first indication information being used for determining sub-bands used for communication on an unlicensed carrier, wherein the unlicensed carrier includes at least two sub-bands; and determining, by the terminal device according to the first indication information, the sub-bands on the unlicensed carrier for the network device to transmit a downlink channel and/or a downlink signal.

In a second aspect, the embodiments of the present disclosure can provide a method for determining a transmission bandwidth, which is applied to a terminal device, and the method includes sending, by a network device, first indication information to a terminal device, the first indication information being used for the terminal device to determine sub-bands on an unlicensed carrier which are used for transmission of a downlink channel and/or a downlink signal by the network device, wherein the unlicensed carrier includes at least two sub-bands.

In a third aspect, the embodiments of the present disclosure also provide a method for determining a transmission bandwidth, which is applied to a terminal device, and the method includes sending, by the terminal device, first indication information to a network device, the first indication information being used for the network device to determine sub-bands on the unlicensed carrier which are used for transmission of an uplink channel and/or uplink signal by the terminal device, wherein the unlicensed carrier includes at least two sub-bands.

In a specific implementation of the solution, the sending, by the terminal device, the first indication information to the network device includes sending a reference signal by the terminal device to the network device, where the reference signal carries the first indication information.

Optionally, the reference signal includes at least one of the following signals: a DMRS for PUSCH demodulation, a DMRS for PUCCH demodulation, and a SRS.

Optionally, the reference signal carrying the first indication information includes an initialization parameter generated by a sequence of the reference signal being determined according to the first indication information.

Optionally, a sequence length of the reference signal is determined according to the first indication information.

In a specific implementation of the solution, the sending, by the terminal device, the first indication information to the network device includes sending uplink control information (UCI) by the terminal device to the network device, the UCI including the first indication information.

Optionally, the UCI is transmitted through a PUSCH or a PUCCH.

Based on any of the foregoing implementations, the first indication information includes at least one of the following information an index of each sub-band included in a first sub-band, where the first sub-band includes sub-bands used for communication among the sub-bands included in an unlicensed carrier or sub-bands used for communication among the sub-bands included in a first bandwidth part BWP of the terminal device; a sub-band with a smallest index in the first sub-band; a sub-band with a largest index in the first sub-band; a number of sub-bands included in the first sub-band; an index of each sub-band included in a second sub-band, where the second sub-band includes sub-bands not used for communication among the sub-bands included in the unlicensed carrier or sub-bands not used for communication among the sub-bands included in the first BWP of the terminal device; a sub-band with a smallest index in the second sub-band; a sub-band with a largest index in the second sub-band; a number of sub-bands included in the second sub-band; and first identification information for indicating that the first indication information indicates the first sub-band or the second sub-band.

In a fourth aspect, the embodiments of the present disclosure also provide a method for determining a transmission bandwidth, including receiving, by a network device, first indication information sent by a terminal device, the first indication information being used for determining sub-bands used for communication on an unlicensed carrier, wherein the unlicensed carrier includes at least two sub-bands; and determining, by the network device according to the first indication information, the sub-bands on the unlicensed carrier which are used for transmission of an uplink channel and/or uplink signal by the terminal device.

On the basis of the foregoing embodiments, the receiving, by the network device, the first indication information sent by the terminal device includes receiving, by the network device, a reference signal sent by the terminal device, where the reference signal carries the first indication information; and determining the first indication information by the network device according to the reference signal.

Optionally, the reference signal includes: a DMRS for PUSCH demodulation, a DMRS for PUCCH demodulation, and/or a SRS.

Optionally, the reference signal carrying the first indication information includes an initialization parameter generated by a sequence of the reference signal being determined according to the first indication information.

Optionally, a sequence length of the reference signal is determined according to the first indication information.

Optionally, the receiving, by the network device, the first indication information sent by the terminal device includes receiving, by the network device, UCI sent by the terminal device, where the UCI includes the first indication information; and determining the first indication information by the network device according to the UCI.

Optionally, the UCI is transmitted through a PUSCH or a PUCCH.

Based on any of the foregoing implementations, the first indication information includes at least one of the following information: an index of each sub-band included in a first sub-band, where the first sub-band includes sub-bands used for communication among the sub-bands included in an unlicensed carrier or sub-bands used for communication among the sub-bands included in a first bandwidth part BWP of the terminal device; a sub-band with a smallest index in the first sub-band; a sub-band with a largest index in the first sub-band; a number of sub-bands included in the first sub-band; an index of each sub-band included in a second sub-band, where the second sub-band includes sub-bands not used for communication among the sub-bands included in the unlicensed carrier or sub-bands not used for communication among the sub-bands included in the first BWP of the terminal device; a sub-band with a smallest index in the second sub-band; a sub-band with a largest index in the second sub-band; a number of sub-bands included in the second sub-band; and first identification information for indicating that the first indication information indicates the first sub-band or the second sub-band.

In a fifth aspect, the embodiments of the present disclosure can provide a terminal device, including: a receiving module configured to receive first indication information sent by a network device, the first indication information being used for determining sub-bands used for communication on an unlicensed carrier, wherein the unlicensed carrier includes at least two sub-bands; and a processing module configured to determine, according to the first indication information, the sub-bands on the unlicensed carrier which are used for transmission of a downlink channel and/or downlink signal by the network device.

In a sixth aspect, the embodiments of the present disclosure can provide a network device, including: a sending module configured to send first indication information to a terminal device, the first indication information being used for the terminal device to determine sub-bands on an unlicensed carrier which are used for transmission of a downlink channel and/or a downlink signal by the network device, wherein the unlicensed carrier includes at least two sub-bands.

In a seventh aspect, the embodiments of the present disclosure can also provide a terminal device, including: a sending module configured to send first indication information to a network device, the first indication information being used for the network device to determine sub-bands on the unlicensed carrier which are used for transmission of an uplink channel and/or uplink signal by the terminal device, wherein the unlicensed carrier includes at least two sub-bands.

In an eighth aspect, the embodiments of the present disclosure can also provide a network device, including: a receiving module configured to receive first indication information sent by a terminal device, the first indication information being used for determining sub-bands used for communication on an unlicensed carrier, wherein the unlicensed carrier includes at least two sub-bands; and a processing module configured to determine, according to the first indication information, the sub-bands on the unlicensed carrier which are used for transmission of an uplink channel and/or uplink signal by the terminal device.

In a ninth aspect, embodiments of the present disclosure can provide a terminal device, including a processor, a memory, a receiver, a transmitter and an interface for communication with the terminal device, wherein the memory stores computer executable instructions; the processor executes the computer-executable instructions stored in the memory to cause the processor to perform the method for determining the transmission bandwidth provided in any one of the first aspect or the third aspect.

Optionally, the processor can be a chip.

In a tenth aspect, the embodiments of the present disclosure can provide a network device, including a processor, a memory, a transmitter and an interface for communication with the network device, wherein the memory stores computer-executable instructions; the processor executes the computer-executable instructions stored in the memory to cause the processor to perform the method for determining the transmission bandwidth provided in any one of the second aspect or the fourth aspect.

Optionally, the processor can be a chip.

In an eleventh aspect, the embodiments of the present disclosure can provide a computer-readable storage medium, wherein the computer-readable storage medium stores computer-executable instructions which, when being executed by a processor, are used to implement the method for determining the transmission bandwidth provided in any one of the first aspect or the third aspect.

In an twelfth aspect, the embodiments of the present disclosure can provide a computer-readable storage medium, wherein the computer-readable storage medium stores computer-executable instructions which, when being executed by a processor, are used to implement the method for determining the transmission bandwidth provided in any one of the second aspect or the fourth aspect.

In a thirteenth aspect, the embodiments of the present disclosure provide a program which, when being executed by a processor, are used to perform the method for determining the transmission bandwidth provided in any one of the first aspect or the third aspect.

In a fourteenth aspect, the embodiments of the present disclosure provide a program which, when being executed by a processor, are used to perform the method for determining the transmission bandwidth provided in any one of the second aspect or the fourth aspect.

In a fifteenth aspect, the embodiments of the present disclosure provide a computer program product including program instructions which are used to implement the method for determining the transmission bandwidth provided in any one of the first aspect or the third aspect.

In a sixteenth aspect, the embodiments of the present disclosure provide a computer program product including program instructions which are used to implement the method for determining the transmission bandwidth provided in any one of the second aspect or the fourth aspect.

In a seventeenth aspect, the embodiments of the present disclosure provide a chip, including a processing module and a communication interface, and the processing module can perform the method for determining the transmission bandwidth provided in any one of the first aspect or the third aspect.

Further, the chip also includes a storage module such as a memory, the storage module is configured to store instructions, the processing module is configured to execute the instructions stored in the storage module, and the execution of the instructions stored in the storage module causes the processing module to perform the method for determining the transmission bandwidth provided in any one of the first aspect or the third aspect.

In an eighteenth aspect, the embodiments of the present disclosure provide a chip, including a processing module and a communication interface, and the processing module can perform the method for determining the transmission bandwidth provided in any one of the second aspect or the fourth aspect.

Further, the chip also includes a storage module such as a memory, the storage module is configured to store instructions, the processing module is configured to execute the instructions stored in the storage module, and the execution of the instructions stored in the storage module causes the processing module to perform the method for determining the transmission bandwidth provided in any one of the second aspect or the fourth aspect.

BRIEF DESCRIPTION OF THE DRAWINGS

To make the technical solutions in the embodiments of the present disclosure or the related art more clear, the accompanying drawings which are referred to in the description of the embodiments or the related art will be briefly described below. Obviously, the drawings in the following description show some embodiments of the present disclosure, and a person of ordinary skill in the art can still derive other drawings from these accompanying drawings without creative efforts.

DETAILED DESCRIPTION

Figure 1:
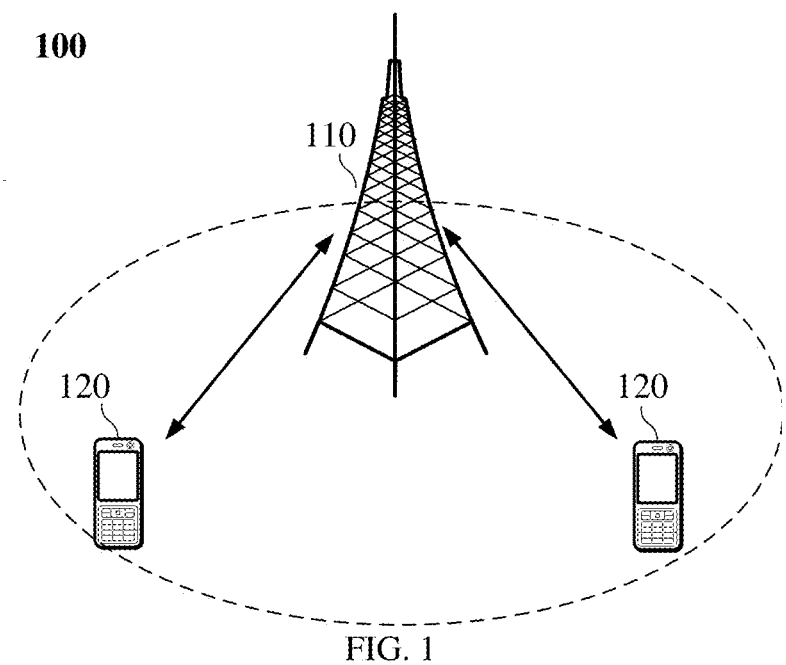
FIG. 1 is a schematic diagram of a communication system according to an embodiment of the present disclosure.

In order to make the purpose, technical solutions and advantages of the embodiments of the present disclosure more clear, the technical solutions in the embodiments of the present disclosure will be described clearly and completely in conjunction with the accompanying drawings in the embodiments of the present disclosure. Obviously, the described embodiments are part of embodiments of the present disclosure, but not all the embodiments. All other embodiments obtained by those of ordinary skill in the art based on the embodiments of the present disclosure without creative work shall fall within the protection scope of the present disclosure.

The terms "first", "second", etc. in the description, claims, and the drawings of the embodiments of the present disclosure are used to distinguish between similar objects, and are not necessarily used to describe a specific sequence or order. It should be understood that the data used in this way can be interchanged under appropriate circumstances, so that the embodiments of the present disclosure described herein can be implemented in a sequence other than those illustrated or described herein, for example. In addition, the terms "include" and "have" and any variations thereof are intended to cover non-exclusive inclusions. For example, a process, method, system, product, or device that includes a series of steps or units is not necessarily limited to those steps or units clearly listed, and may include other steps or units that are not clearly listed or are inherent to the process, method, product, or device.

The technical solutions in the embodiments of the present disclosure will be described below in connection with the drawings in the embodiments of the present disclosure. Obviously, the described embodiments are part of the embodiments of the present disclosure, but not all the embodiments. All other embodiments obtained by those of ordinary skill in the art based on the embodiments in the present disclosure without creative work fall within the protection scope of the present disclosure.

The technical solutions of the embodiments of the present disclosure can be applied to various communication systems, such as a Global System of Mobile Communication (GSM) system, a Code Division Multiple Access (CDMA) system, a Wideband Code Division Multiple Access (WCDMA) system, a General Packet Radio Service (GPRS), a Long Term Evolution (LTE) system, a LTE Frequency Division Duplex (FDD) system, a LTE Time Division Duplex (TDD) system, an Advanced long term evolution (LTE-A) system, a NEW Radio (NR) system, an evolution system of a NR system, a LTE-based access to unlicensed spectrum (LTE-U) system, a NR-based access to unlicensed spectrum (NR-U) system, an Universal Mobile Telecommunication System (UMTS), a Global Interoperability for Microwave Access (WiMAX) communication system, a Wireless Local Area Network (WLAN), a Wireless Fidelity (Wi-Fi), a next-generation communication system, other communication systems, or the like.

Generally speaking, traditional communication systems support a limited number of connections and are easy to implement. However, with the development of communication technologies, mobile communication systems will not only support traditional communications, but will also support, for example, Device to Device (D2D) communication, machine to machine (M2M) communication, machine type communication (MTC), vehicle to vehicle (V2V) communication, etc. The embodiments of the present disclosure can also be applied to these communication systems.

FIG. 1 is a schematic diagram of a communication system to which an embodiment of the present disclosure is applied. As shown in FIG. 1, a communication system 100 may include a network device 110 which may be a device that communicates with a terminal device 120 (or referred to as a communication terminal or a terminal). The network device 110 can provide communication coverage for a specific geographic area, and can communicate with terminal devices located in the coverage area. Optionally, the network device 110 can be a Base Transceiver Station (BTS) in a GSM system or a CDMA system, a NodeB (NB) in a WCDMA system, an Evolutional Node B (eNB or eNodeB) in a LTE system, or a wireless controller in a Cloud Radio Access Network (CRAN). Optionally, the network device can be a mobile switching center, a relay station, an access point, an on-board device, a wearable device, a hub, a switch, a bridge, a router, a network side device in 5G network, a network device in future evolutional Public Land Mobile Network (PLMN), or the like.

The communication system 100 also includes at least one terminal device 120 located within the coverage range of the network device 110. As used herein, the terminal device includes, but is not limited to, a device configured to receive/send communication signals and/or an Internet of Things (IoT) device, which may be connected with another device via wired lines, such as Public Switched Telephone Networks (PSTN), Digital Subscriber Line (DSL), digital cables, and direct cable connections; and/or via another data connection/network; and/or via a wireless interface, such as cellular networks, wireless local area networks (WLAN), digital TV networks such as DVB-H networks, satellite networks, AM-FM broadcast transmitter. A terminal device configured to communicate through a wireless interface may be referred to as "a wireless communication terminal", "a wireless terminal" or "a mobile terminal". Examples of the mobile terminal include but are not limited to satellite or cellular phones; Personal Communications System (PCS) terminals that can combine cellular radio phones with data processing, fax, and data communication capabilities; PDA that may include radio phones, pagers, Internet/intranet access, Web browser, memo pad, calendar, and/or Global Positioning System (GPS) receiver; and conventional laptop and/or palmtop receivers or other electronic devices including radio telephone transceivers. The terminal device may refer to access terminals, user equipment (UE), user units, user stations, mobile stations, mobile consoles, remote stations, remote terminals, mobile equipment, user terminals, terminals, wireless communication equipment, user agents, or user device. The access terminal may be a cellular phone, a cordless phone, a Session Initiation Protocol (SIP) phone, a wireless local loop (WLL) station, a personal digital assistant (PDA), and wireless communication functional handheld devices, computing devices or other processing devices connected to wireless modems, in-vehicle devices, wearable devices, terminal devices in 5G networks, terminal devices in the future evolution of PLMN, or the like.

Optionally, Device to Device (D2D) communication may be performed between the terminal devices 120.

Optionally, the 5G system or 5G network may also be referred to as a New Radio (NR) system or NR network.

FIG. 1 exemplarily shows one network device and two terminal devices. Optionally, the communication system 100 may include a plurality of network devices and other numbers of terminal devices can be included in the coverage of each network device, which is not particularly limited in the embodiments of the present disclosure.

In FIG. 1, the network device may be an access device, for example, it may be an access device in an NR-U system, such as a next generation Node B (gNB) of 5G new radio access technology, a small station or a micro station, or can also be a relay station, a Transmission and Reception Point (TRP), a Road Side Unit (RSU), etc.

The terminal device can also be called a mobile terminal, User Equipment (UE), an access terminal, a user unit, a user station, a mobile station, a mobile console, a user terminal, a terminal, a wireless communication device, a user agent, or a user device. Specifically, it can be smart phones, cellular phones, cordless phones, personal digital assistant (PDA) devices, handheld devices with wireless communication functions, or other processing devices connected to wireless modems, in-vehicle devices, wearable devices, etc. In the embodiments of the present disclosure, the terminal device has an interface for communicating with a network device, for example, a cellular network.

Optionally, the communication system 100 can also include other network entities such as a network controller and a mobility management entity, which are not limited in the embodiments of the present disclosure.

It should be understood that the device with a communication function in the network and/or system of the embodiments of the present disclosure can be referred to as the communication device. Taking the communication system 100 shown in FIG. 1 as an example, the communication device may include a network device 110 and terminal devices 120 which have the communication function. The network device 110 and the terminal devices 120 may be the specific devices as described above, which will not be repeated here. The communication device may also include other devices in the communication system 100, such as a network controller, a mobility management entity, and other network entities, which are not limited in the embodiments of the present disclosure.

It should be understood that the terms "system" and "network" are often used interchangeably herein. The term "and/or" used herein is merely to describe relative relationships of relative objects, indicating that there can be three kinds of relationships. For example, A and/or B can indicate three cases where A exists alone, A and B exist simultaneously, or B exists alone. In addition, the character "/" used herein generally indicates that the related objects before and after this character are in an "or" relationship.

The method of the embodiments of the present disclosure can be applied to the communication in the unlicensed spectrum, or can also be applied to other communication scenarios, such as the communication scenario in the licensed spectrum, which is not limited in the solution.

The unlicensed spectrum is a spectrum that can be used for radio device communication. This spectrum is usually considered to be a shared spectrum, that is, the spectrum can be used by communication devices in different communication systems provided that they fulfill the national or regional regulatory requirements set on the spectrum, and it is not necessary to apply for a proprietary spectrum authorization. In order to allow various communication systems that use the unlicensed spectrum for wireless communication to coexist friendly on this spectrum, some countries or regions have stipulated regulatory requirements that must be met when using the unlicensed spectrum. For example, the communication device follows a "Listen Before Talk (LBT)" principle, that is, the communication device needs to perform channel listening before sending signals on a channel of the unlicensed spectrum. Only when the channel listening result is that the channel is idle, the communication device can send signals, and if the channel listening result of the communication device on the channel of the unlicensed spectrum is that the channel is busy, the communication device cannot send signals. In order to ensure fairness, in one transmission, a time duration that a communication device uses a channel of the unlicensed spectrum for signal transmission cannot exceed a Maximum Channel Occupancy Time (MCOT).

Figure 2:
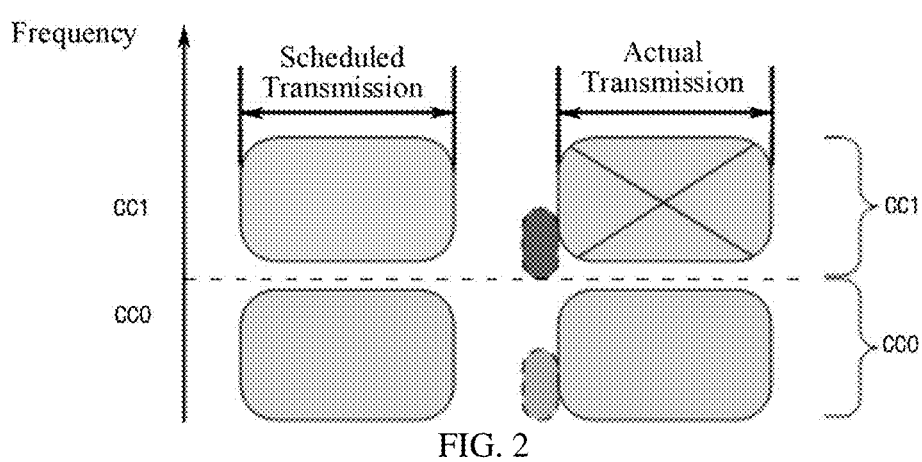
FIG. 2 is a schematic diagram of a network device scheduling a signal transmission bandwidth according to an embodiment of the present disclosure.

FIG. 2 is a schematic diagram of a network device scheduling a signal transmission bandwidth. As shown in FIG. 2, a BWP0 configured by the network device (base station) for the terminal device (UE) includes two sub-bands: a first sub-band and a second sub-band. Optionally, the sub-bands may be LBT sub-bands or sub-bands determined in other ways. The base station plans to transmit a Physical Downlink Shared Channel (PDSCH) to the UE by scheduling the first sub-band and the second sub-band. However, in the channel detection performed on each sub-band, the LBT on the first sub-band succeeds, and the LBT on the second sub-band fails, and thus the base station transmits the PDSCH to the UE through the first sub-band included in BWP #0. Although the downlink multi-sub-band adaptive transmission in the NR-U system is supported, as for the UE, the LBT sub-bands included in the configured and activated BWP are notified to the UE through RRC signaling in advance, but the actual LBT sub-bands in the activated BWP that can be used for PDSCH transmission are determined by the network device after the completion of the LBT. Therefore, how to notify the UE of the LBT sub-bands used for the PDSCH transmission is a problem to be solved.

With respect to this problem, the present disclosure provides a method for determining a transmission bandwidth, a method on how a terminal device determines LBT sub-bands actually used for communication among multiple LBT sub-bands included in an activated BWP of the terminal device when the BWP includes the multiple LBT sub-bands on an unlicensed carrier and the LBT sub-band adaptive transmission is supported. A primary inventive concept includes that the network device sends indication information to the terminal device, so that the terminal device determines, according to the indication information, the LBT sub-bands actually used for communication among the multiple LBT sub-bands included in the BWP.

First of all, in the embodiments of this disclosure, the following should be understood.

The downlink channel may include any of the following: a Physical Downlink Control Channel (PDCCH), an Enhanced Physical Downlink Control Channel (EPDCCH), a Physical Downlink Shared Channel (PDSCH), a Physical Hybrid ARQ Indicator Channel (PHICH), a Physical Multicast Channel (PMCH), a Physical Broadcast Channel (PBCH), or the like.

The downlink signal may include a downlink Synchronization Signal, a Phase Tracking Reference Signal (PT-RS), a downlink DeModulation Reference Signal (DMRS), a Channel State Information-Reference Signal (CSI-RS), or the like, where, optionally, the downlink synchronization signal can be used for the communication device to access a network and used for radio resource management and measurement, the downlink DMRS can be used for demodulation of the downlink channel, and the CSI-RS can be used for measurement of the downlink channel, downlink time-frequency synchronization or phase tracking, and the PT-RS can also be used for the downlink channel measurement, the downlink time-frequency synchronization or the phase tracking. It should be understood that the embodiments of the present disclosure may include downlink channels or downlink signals with the same names and different functions as the foregoing ones, and may also include downlink channels or downlink signals with different names and the same functions as the foregoing ones, which are not limited in the present disclosure.

The uplink channel may include any of the following: a Physical Random Access CHannel (PRACH), a Physical Uplink Control CHannel (PUCCH), a Physical Uplink Shared CHannel (PUSCH), or the like.

The uplink signal may include an uplink DeModulation Reference Signal (DMRS), a Sounding Reference Signal (SRS), a Phase Tracking Reference Signal (PT-RS), or the like. The uplink DMRS can be used for demodulation of the uplink channel, the SRS can be used for uplink channel measurement, uplink time-frequency synchronization or phase tracking, and PT-RS can also be used for the uplink channel measurement, uplink time-frequency synchronization or phase tracking. It should be understood that the embodiments of the present disclosure may include uplink channels or uplink signals with the same names and different functions as the foregoing ones, and may also include uplink channels or uplink signals with different names and the same function as the foregoing ones, which are not limited in the present disclosure.

The technical solutions of the present disclosure will be described in detail below by way of several specific embodiments.

Figure 3:
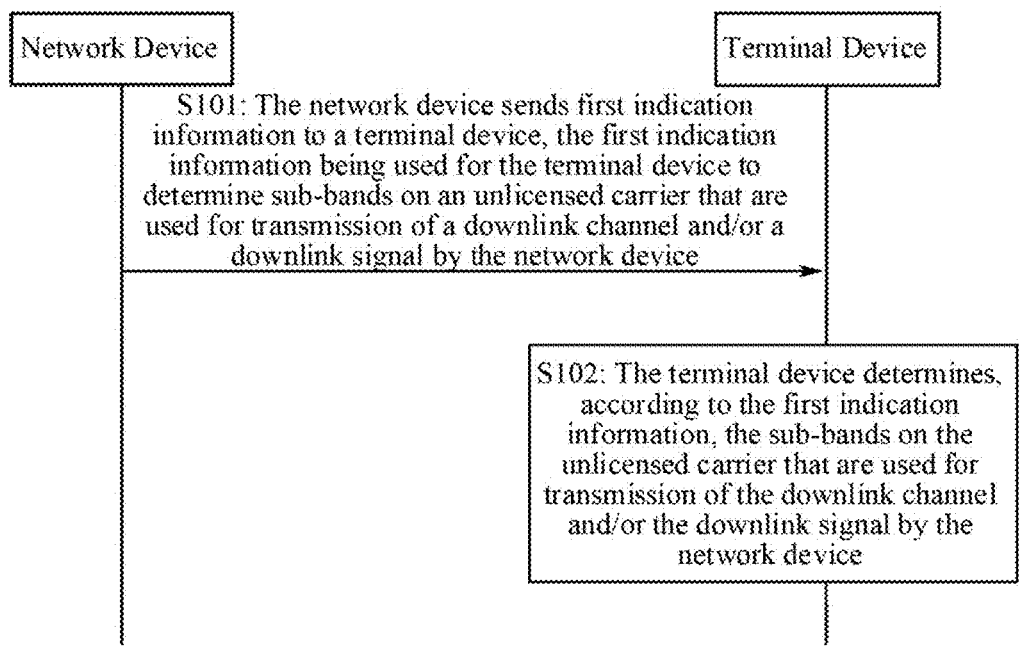
FIG. 3 is a flowchart of a first embodiment of a method for determining a transmission bandwidth according to an embodiment of the present disclosure.

FIG. 3 is a flowchart of a first embodiment of a method for determining a transmission bandwidth according to an embodiment of the present disclosure. As shown in FIG. 3, the method for determining the transmission bandwidth is applied between a network device and a terminal device to determine the transmission bandwidth of a downlink channel and/or a downlink signal, and the method specifically includes the following steps.

At S101, the network device sends first indication information to the terminal device, where the first indication information is used for the terminal device to determine one or more sub-bands on an unlicensed carrier which are used to transmit a downlink channel and/or a downlink signal by the network device.

At this step, when the network device needs to transmit the downlink channel to the terminal device, it sends configuration information to the terminal device in advance and configures resources of the unlicensed carrier for transmission of the downlink channel, that is, the network device schedules the terminal device to receive the downlink channel and/or the downlink signal on which resources of the unlicensed carrier, and the unlicensed carrier includes at least two sub-bands. When the downlink channel and/or downlink signal transmission is to be performed, channel detection is performed on the sub-bands on the resources configured for the terminal device for transmission of the downlink channel and/or downlink signal, that is, it is necessary to confirm whether there is any sub-band that cannot be used, for example, a sub-band that is being used by another communication device, or the like.

After the channel detection is completed, the network device determines which sub-bands cannot be used according to the detection result, and thus can determine specific sub-bands used for communication with the terminal device, and it needs to notify the terminal device of the sub-bands used for the communication. In the technical solution according to the embodiment, the notification can be can performed through the first indication information, so the first indication information is mainly used to indicate the sub-bands for the terminal device for communication.

Optionally, in a specific implementation of the solution, the first indication information may specifically include at least one of the following information: (1) an index of each sub-band included in a first sub-band, where the first sub-band includes sub-bands for communication among the sub-bands included in the unlicensed carrier or sub-bands for communication among the sub-bands included in a first bandwidth part (BWP) of the terminal device; (2) a sub-band with a smallest index in the first sub-band; (3) a sub-band with a largest index in the first sub-band; (4) a number of sub-bands included in the first sub-band; (5) an index of each sub-band included in a second sub-band, where the second sub-band in this solution includes sub-bands not used for communication among the sub-bands included in the unlicensed carrier or sub-bands not used for communication among the sub-bands included in the first BWP of the terminal device; (6) a sub-band with a smallest index in the second sub-band; (7) a sub-band with a largest index in the second sub-band; (8) a number of sub-bands included in the second sub-band; and (9) first identification information for indicating that the first indication information indicates the first sub-band or the second sub-band, that is, the first identification information is mainly used to distinguish whether the first indication information is directed to the first sub-band or the second sub-band.

The network device needs to send the first indication information to the terminal device so that the terminal device can determine, according to the first indication information, the sub-bands for receiving the downlink channel and/or the downlink signal. In a specific implementation of the solution, manners for sending the indication information by the network device include at least the following.

In a first manner, a reference signal is sent to the terminal device, and the reference signal carries the first indication information.

That is, the terminal device receives the reference signal sent by the network device, and the first indication information is carried in the reference signal.

This solution means that the first indication information is carried in the reference signal, or in other words, different contents of the first indication information are indicated by sending different reference signal sequences. Since the first indication information is carried in the reference signal, the terminal device can determine the bandwidth for the downlink channel transmission by blindly detecting existence of the reference signal, thereby saving signaling overhead. In addition, from the perspective of the network device, since the time for preparing the reference signal is relatively short, the network device can determine and send the corresponding reference signal sequence according to the LBT result after the LBT ends.

Optionally, in a specific implementation of the solution, a length of a sequence of the reference signal is determined according to the first indication information. For example, if the downlink channel transmission bandwidth determined according to the first indication information includes two sub-bands, the length of the reference signal sequence corresponds to a frequency-domain bandwidth of two sub-bands.

Optionally, in a specific implementation of the solution, the length of the sequence of the reference signal is independently determined for each sub-band.

Optionally, an initialization parameter generated by the sequence of the reference signal is determined according to the first indication information. It is assumed that the first indication information includes M states, or in other words, the first indication information is represented by m, and the value of m is 0, 1, 2, . . . , M−1. Since the reference signal sequence is generated from a scrambling sequence generator, in this method, the initialization parameter $C_{init}$ of the scrambling sequence generator is determined according to the value of m.

As an example rather than limitation, it is assumed that the initialization parameter generated by the reference signal sequence on the licensed spectrum is $C_{init}=(A) \bmod 2^B$, wherein, the states included in A can be represented by $2^C$, then the initialization parameter generated by the reference signal sequence on the unlicensed spectrum is $C_{init}=2^C*m+A) \bmod 2^B$.

As an example rather than limitation, it is assumed that the initialization parameter generated by the reference signal sequence on the licensed spectrum is $C_{init}=(A) \bmod 2^B$, wherein, the M states can be represented by $2^D$, then the initialization parameter generated by the reference signal sequence on the unlicensed spectrum is $C_{init}=2^D*A+m) \bmod 2^B$.

In the implementation in which the first indication information is carried in the reference signal, the reference signal may be at least one of the following: a DMRS for PDSCH demodulation, a DMRS for PDCCH demodulation, a DMRS for PBCH demodulation, and a CSI-RS. The specific implementation is as follows.

Optionally, the reference signal may be the DMRS for the PDSCH demodulation. Since the PDCCH can usually be transmitted through resources in one sub-band, in this solution, there is no additional complexity for the network device and terminal device to send and receive the PDCCH, and by carrying the first indication information in the DMRS of the PDSCH, only the terminal device that is scheduled to receive the PDSCH needs to determine the downlink channel (i.e., downlink signal) transmission bandwidth, thereby reducing the complexity of the blind detection of the terminal device.

Optionally, the reference signal may be the DMRS for the PDCCH demodulation. When the first indication information is carried by the DMRS of the PDCCH, the terminal device can blindly detect the existence of different DMRS signals of the PDCCHs, and can determine the downlink channel transmission bandwidth when the existence of the DMRS is detected. The disadvantage of this solution is that a plurality of DMRS sequences of the PDCCHs need to be blindly detected, and the complexity may be increased.

In a second manner, a PDCCH is sent to the terminal device, and the PDCCH carries the first indication information.

That is, the terminal device receives the PDCCH sent by the network device, the PDCCH includes the first indication information, and the first indication information is determined according to the PDCCH.

In a specific implementation of this solution, the PDCCH includes the first indication information, including at least one of the following situations where: Downlink Control Information (DCI) transmitted in the PDCCH includes the first indication information; Cyclic Redundancy Check (CRC) corresponding to the PDCCH is determined according to the first indication information; and a Radio Network Temporary Identifier (RNTI) for scrambling the PDCCH is determined according to the first indication information.

In an implementation of the solution, the first indication information is carried in the control information, or in other words, the first instruction information is sent through the control information display. The first indication information is indicated through the display signaling, which can improve the reliability of reception of the first indication information. The control information may be DCI common to a cell or DCI common to a group. For example, the first indication information is carried in SFI indication information. It should be understood that since the PDCCH is usually configured periodically, it is not necessarily within the transmission period of the PDCCH when the network device obtains the usage right of the channel on the unlicensed frequency band, and thus this method can be used in combination with the first manner.

Optionally, the control information may also be UE-specific DCI. For example, the first indication information is carried in the downlink grant information for scheduling the terminal device to receive the PDSCH.

Optionally, in a specific implementation, when the network device sends the PDCCH to the terminal device, some or all of the bits in the CRC used for the PDCCH transmission carry the first indication information. For example, assuming that the first indication information includes 4 bits, these 4 bits and the last 4 bits of the CRC of the PDCCH are scrambled to form a new CRC, and the new CRC is used for PDCCH check. The terminal device can determine the downlink channel transmission bandwidth after correctly receiving the PDCCH through comparisons of different CRCs.

Optionally, in another specific implementation, the first indication information is indicated by different RNTIs, and when the network device sends the PDCCH to the terminal device, the corresponding RNTI is selected according to the LBT result. The terminal device can determine the downlink channel transmission bandwidth after correctly receiving the PDCCH through the comparison of different RNTIs.

Optionally, for the PDCCH, there is at least one of the following situations where: the PDCCH is scrambled according to a RNTI common to a cell; the PDCCH is scrambled according to the RNTI common to a group; or the PDCCH is scrambled according to the RNTI specific to the terminal device.

As for the terminal device side, the terminal device receives the first indication information sent by the network device, the first indication information being used for determining the sub-band(s) used for communication on the unlicensed carrier, where the unlicensed carrier includes at least two sub-bands.

Similarly, for the terminal device, the first indication information sent by the network device can also be received in the following manners.

In a first manner, a reference signal sent by the network device is received, the reference signal carries the first indication information, and the first indication information is determined according to the reference signal.

The reference signal includes at least one of the following: a demodulation reference signal (DMRS) used for demodulation of a physical downlink shared channel (PDSCH); a DMRS used for demodulation of a physical downlink control channel (PDCCH); a DMRS used for demodulation of a physical broadcast channel (PBCH); and a Channel state information reference signal (CSI-RS).

In a second manner, the terminal device receives the PDCCH sent by the network device, the PDCCH including the first indication information, and determines the first indication information according to the PDCCH.

In an implementation of this solution, the PDCCH includes the first indication information, including at least one of the following situations where: DCI transmitted in the PDCCH includes the first indication information; CRC corresponding to the PDCCH is determined according to the first indication information; and a RNTI for PDCCH scrambling is determined according to the first indication information.

In an implementation of this solution, for the PDCCH, there is at least one of the following situations where: the PDCCH is scrambled according to the RNTI common to a cell; the PDCCH is scrambled according to the RNTI common to a group; and the PDCCH is scrambled according to the RNTI specific to the terminal device.

The specific implementation and meaning thereof correspond to those described above with respect to the network device side.

At S102, the terminal device determines, according to the first indication information, the sub-bands on the unlicensed carrier that are used for transmission of the downlink channel and/or the downlink signal by the network device.

After the terminal device receives the first indication information sent by the network device in the above manner, it needs to determine, according to the first indication information, the sub-band(s) for the network device to transmit the downlink channel and/or downlink signal, that is, the sub-band(s) for receiving the downlink channel and/or downlink signal, and the specific determination method differs depending on the contents specifically indicated by the first indication information. The following describes how to determine the sub-band(s) for the transmission of the downlink channel and/or the downlink signal according to the first indication information when the first indication information indicates different information. The following description is given in an example where the first sub-band includes the sub-bands used for communication in the unlicensed carrier and the second sub-band includes the sub-bands not used for communication in the unlicensed carrier.

In a first case, the first indication information is used to indicate indices of the sub-bands included in the first sub-band.

In an implementation of this solution, optionally, a bit mapping manner may be used to indicate the indices of the sub-bands included in the first sub-band. For example, assuming that the unlicensed carrier includes N sub-bands, the first indication information includes N bits, and each bit is used to indicate whether a sub-band is used for communication. For example, when the unlicensed carrier includes 4 sub-bands, the first indication information includes 4 bits. For another example, when the unlicensed carrier includes 2 sub-bands, the first indication information includes 2 bits. The advantage of this solution is its simplicity, and the disadvantage is that the signaling overhead is relatively large.

It should be understood that, in the multi-sub-band adaptive transmission of the NR-U system, when the sub-bands for which the network device obtains the channel usage right is less than the sub-bands included in the system carrier, in order to be able to perform transmission by using part of the sub-bands for which the channel usage right is obtained, the network device needs to reserve sidebands on both sides of the sub-bands for which the channel usage right is obtained so as to prevent interference to transmissions on the unlicensed spectrum by other systems. For example, assuming that the unlicensed carrier includes 4 sub-bands and the sub-bands for which the network device obtains the channel usage right are sub-band 0 and sub-band 2, if the transmission is to be performed through the sub-band 0 and sub-band 2, the sidebands on both sides of sub-band 0 and on both sides of sub-band 2 need to be reserved.

Optionally, a restriction on the multi-sub-band adaptive transmission of the NR-U system is that the number of sub-bands actually used for transmission is not less than half of the number of the sub-bands configured. For example, the unlicensed carrier includes N sub-bands, and the number of sub-bands actually used for transmission on the unlicensed carrier is $K \geq N/2$. For another example, the first BWP on the unlicensed carrier includes N sub-bands, and the number of sub-bands actually used for transmission on the first BWP is $K \geq N/2$. This restriction can guarantee the performance of the adaptive transmission.

Optionally, the multi-sub-band adaptive transmission of the NR-U system is limited to transmission on one or more sub-bands that are continuous in the frequency domain. For example, if the sub-bands for which the network device obtains the channel usage right are sub-band 1 and sub-band 2 and the transmission is to be performed through the sub-band 1 and sub-band 2, it only needs to reserve the sideband on one side of the sub-band 1 and on the other side of the sub-band 2, and there is no need to reserve the sideband between the sub-band 1 and the sub-band 2. In this way, the influence of the reserved sidebands can be reduced. In this case, the states included in the first indication information can be further simplified.

In a second case, the first indication information is used to indicate the sub-band with the smallest index in the first sub-band.

In a specific implementation of the solution, for example, the control information (for example, PDCCH) is transmitted through the sub-band with the largest index in the first sub-band. The terminal device can determine the indices of the sub-bands included in the first sub-band from the index of the sub-band on which the control information is received and the index of the sub-band that is determined according to the first indication information, thereby determining the downlink channel transmission bandwidth. For example, the unlicensed carrier includes 4 sub-bands, sub-bands 0~3, and the first indication information includes 2 bits. After the channel detection succeeds, the network device determines that the sub-bands 1, 2, and 3 are used for communication transmission, and thus the network device transmits the PDCCH to the terminal device through the sub-band 3, and indicates the sub-band 1 through the first indication information (for example, the bits are represented as 01). The terminal device can determine that the downlink channel and/or downlink signal transmission bandwidth includes the sub-bands 1, 2, and 3 according to the sub-band 3 on which the PDCCH is received and according to the sub-band 1 that is determined according to the first indication information.

In a third case, the first indication information is used to indicate the sub-band with the largest index in the first sub-band.

In a specific implementation of the solution, for example, the control information (for example, PDCCH) can be transmitted through the sub-band with the smallest index in the first sub-band. The terminal device can determine the indices of the sub-bands included in the first sub-band from the index of the sub-band on which the control information is received and from the index of the sub-band that is determined according to the first indication information, thereby determining the downlink channel and/or downlink signal transmission bandwidth. For example, the unlicensed carrier includes 4 sub-bands, sub-bands 0~3, and the first indication information includes 2 bits. After the channel detection succeeds, the network device determines that the sub-bands 1, 2, and 3 are used for communication transmission, and the network device transmits the PDCCH to the terminal device through the sub-band 1, and indicates the sub-band 3 through the first indication information (for example, the bits are represented as 11). The terminal device can determine that the downlink channel and/or downlink signal transmission bandwidth includes the sub-bands 1, 2, and 3 according to the sub-band 1 on which the PDCCH is received and according to the sub-band 3 that is determined according to the first indication information.

In a fourth case, the first indication information is used to determine the sub-band with the smallest index in the first sub-band and the number of sub-bands included in the first sub-band.

In a specific implementation of this solution, for example, assuming that the unlicensed carrier includes N sub-bands, the index of the sub-band with the smallest index in the first sub-band is S, the number of the sub-bands included in the first sub-band is L, and the value of the first indication information is R, then $R = N^*(L-1)+S$ if $(L-1) \leq \text{floor}(N/2)$; otherwise, $R = N^*(N-L+1)+(N-1-S)$, where floor means round down, $L \geq 1$ and L is not greater than N-S, $0 \leq S \leq N-1$.

The number of states included in the first indication information is $N^*(N+1)/2$.

For example, the unlicensed carrier includes 4 sub-bands, sub-bands 0~3, and the first indication information includes 10 states (values of 0~9). When the value of the first indication information is 5, the terminal device can determine that the sub-band with the smallest index in the first sub-band is 1 according to the above formula, and that the number of sub-bands included in the first sub-band is 2, and thus can determine that the downlink channel transmission bandwidth includes the sub-bands 1 and 2.

Optionally, the remaining states may be used to indicate a situation where the discontinuous partial sub-bands for which the channel usage right is obtained are used for the transmission. Still in the example where the unlicensed carrier includes 4 sub-bands, the first indication information may include 4 bits, indicating 16 states, of which the first 10 states are used to indicate the situation where the continuous partial sub-bands for which the channel usage right is obtained are used for the transmission, and the latter six states are used to indicate the situation where the discontinuous partial sub-bands for which the channel usage right is obtained are used for the transmission. Further optionally, the case where the discontinuous partial sub-bands for which the channel use right is obtained are used for transmission may include only part of the cases.

It should be understood that in the multi-sub-band adaptive transmission of the NR-U system, it is easier to indicate the sub-band used for communication in some cases (for example, the sub-bands used for communication are continuous sub-bands in the frequency domain), and it is easier to indicate the sub-bands not used for communication in some cases (for example, the sub-bands not used for communication are continuous sub-bands in the frequency domain). Therefore, the first indication information may indicate the sub-band(s) used for communication in some cases, and indicate the sub-band(s) not used for communication in some other cases.

Optionally, the first indication information includes indication information indicating that the first indication information indicates the sub-band(s) used for communication or the sub-band(s) not used for communication, or in other words, the first indication information includes indication information indicating that the first indication information indicates the first sub-band or the second sub-band.

It should be understood that the case where the first indication information includes the indication information of the sub-band(s) not used for communication is similar to the embodiment of the case where the first indication information includes the indication information of the sub-band(s) used for communication, which will not be repeated here.

According to the method for determining the transmission bandwidth according to the above embodiments, after configuring, for the terminal device, the resources for transmission of the downlink channel, the network device performs channel detection on each sub-band of the resources, and then determines which sub-band(s) is (are) used for communication according to the detection result, indicates the same through the first indication information, and sends the first indication information to the terminal device. In this solution, the network device sends the first instruction information to the terminal device, so that the terminal device determines the LBT sub-band(s) actually used for communication among multiple LBT sub-bands according to the first indication information.

Figure 4:
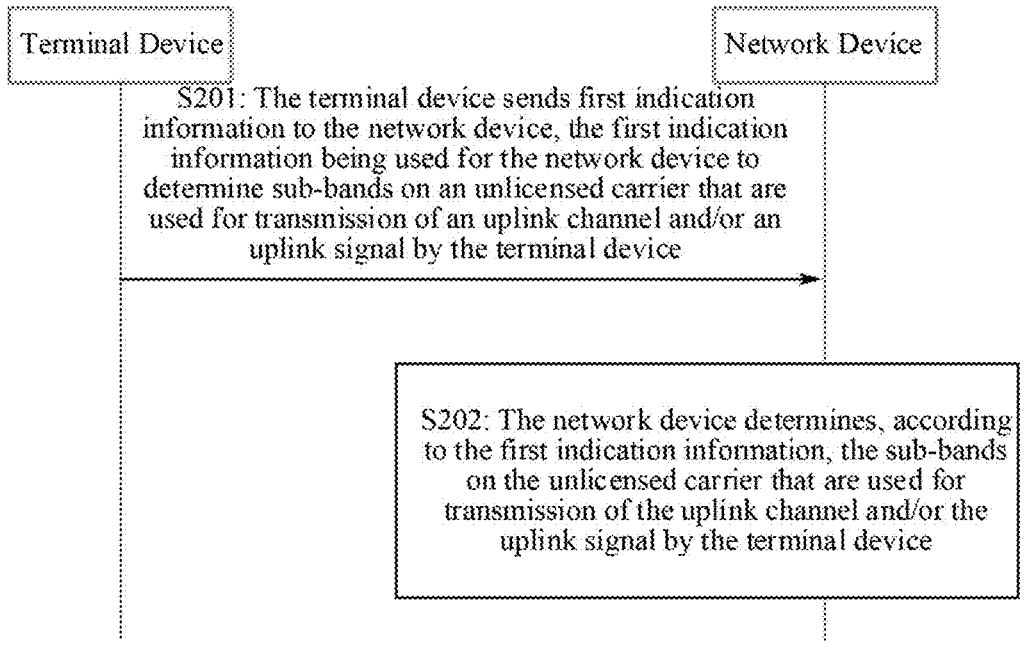
FIG. 4 is a flowchart of a second embodiment of a method for determining a transmission bandwidth according to an embodiment of the present disclosure.

FIG. 4 is a flowchart of a second embodiment of a method for determining a transmission bandwidth according to an embodiment of the present disclosure. As shown in FIG. 4, the method for determining the transmission bandwidth is applied between a network device and a terminal device to determine the transmission bandwidth of a downlink channel and/or a downlink signal, and the method specifically includes the following steps.

At S201, the terminal device sends first indication information to the network device, the first indication information being used for the network device to determine sub-bands on an unlicensed carrier that are used for transmission of an uplink channel and/or an uplink signal by the terminal device.

The unlicensed carrier includes at least two sub-bands.

In this step, the network device schedules for the terminal device on which unlicensed carrier resources the uplink channel transmission is performed. When the uplink channel and/or uplink signal transmission is to be specifically performed, the terminal device performs channel detection on the sub-bands of the unlicensed carrier configured for transmission of the uplink channel and/or uplink signal, that is, it needs to confirm whether there is any sub-band that cannot be used, for example, if a sub-band is being used by another terminal device, this sub-band cannot be used.

After the channel detection is completed, the network device determines which sub-band(s) cannot be used according to the detection result, and thus can determine the sub-band(s) specifically used for communication with the terminal device, and it needs to notify the terminal device of the sub-band(s) used for the communication. In the technical solution according to the embodiment, the notification can be performed through the first indication information, and thus the first indication information is mainly used to indicate the sub-band(s) for the terminal device for communication.

Optionally, in a specific implementation of the solution, the first indication information may specifically include at least one of the following information: (1) an index of each sub-band included in a first sub-band, where the first sub-band in this solution includes: the sub-band(s) used for communication among the sub-bands included in the unlicensed carrier or the sub-band(s) used for communication among the sub-bands included in a first bandwidth part (BWP) of the terminal device; (2) a sub-band with a smallest index in the first sub-band; (3) a sub-band with a largest index in the first sub-band; (4) a number of sub-bands included in the first sub-band; (5) an index of each sub-band included in a second sub-band, where the second sub-band includes the sub-band(s) not used for communication among the sub-bands included in the unlicensed carrier or the sub-band(s) not used for communication among the sub-bands included in the first BWP of the terminal device; (6) a sub-band with a smallest index in the second sub-band; (7) a sub-band with a largest index in the second sub-band; (8) a number of sub-bands included in the second sub-band; and (9) first identification information for indicating that the first indication information indicates the first sub-band or the second sub-band, that is, the first identification information is mainly used to distinguish whether the first indication information is directed to the first sub-band or the second sub-band.

In a specific implementation of this step, after determining the first indication information, the terminal device needs to send the first indication information to the network device, so that the network device can determine the sub-band(s) for receiving the uplink channel and/or uplink signal according to the first indication information. In the specific implementations of the solution, the terminal device sends the first indication information in at least the following manners.

In a first manner, a reference signal is sent to the network device, and the reference signal carries the first indication information.

That is, the network device receives the reference signal sent by the terminal device, the reference signal carries the first indication information, and the network device determines the first indication information according to the reference signal.

This solution means that the first indication information is carried in the reference signal, or in other words, different contents of the first indication information are indicated by sending different reference signal sequences. Since the first indication information is carried in the reference signal, the network device can determine the bandwidth for the uplink channel (i.e., uplink signal) transmission by blindly detecting existence of the reference signal, thereby saving signaling overhead. In addition, from the perspective of the terminal device, since the time for preparing the reference signal is relatively short, the terminal device can determine and send the corresponding reference signal sequence according to the LBT result after the LBT ends.

Optionally, in a specific implementation of the solution, a length of a sequence of the reference signal is determined according to the first indication information. For example, if the uplink channel and/or uplink signal transmission bandwidth determined according to the first indication information includes two sub-bands, the length of the sequence of the reference signal corresponds to a frequency-domain bandwidth of two sub-bands.

Optionally, in a specific implementation of the solution, the length of the sequence of the reference signal is independently determined for each sub-band.

Optionally, an initialization parameter generated by the sequence of the reference signal is determined according to the first indication information.

It is assumed that the first indication information includes M states, or in other words, the first indication information is represented by m, and the value of m is 0, 1, 2, ..., M−1. Since the reference signal sequence is generated from a scrambling sequence generator, in this method, the initialization parameter $C_{init}$ of the scrambling sequence generator is determined according to the value of m.

As an example rather than limitation, it is assumed that the initialization parameter generated by the reference signal sequence on the licensed spectrum is $C_{init}=(A) \bmod 2^B$, where the states included in A can be represented by $2^C$, then the initialization parameter generated by the reference signal sequence on the unlicensed spectrum is $C_{init}=(2^C*m+A) \bmod 2^B$.

As an example rather than limitation, it is assumed that the initialization parameter generated by the reference signal sequence on the licensed spectrum is $C_{init}=(A) \bmod 2^B$, where the M states can be represented by $2^D$, then the initialization parameter generated by the reference signal sequence on the unlicensed spectrum is $C_{init}=(2^D*A+m) \bmod 2^B$.

In the implementations where the first indication information is carried in the reference signal, the reference signal may be at least one of the following: a DMRS for PUSCH demodulation, a DMRS for PUCCH demodulation, and a SRS.

In a second manner, the terminal device sends uplink control information (UCI) to the network device, and the UCI includes the first indication information.

That is, the network device receives the UCI sent by the terminal device, the UCI including the first indication information, and determines the first indication information according to the UCI.

In this solution, the first instruction information is carried in the control information, or in other words, the first instruction information is sent through the control information display. By indicating the first indication information through the display signaling, the reliability of reception of the first indication information can be improved.

Optionally, the UCI information may be transmitted through a PUCCH, through a scheduled PUSCH, or through a Configured Grant-PUSCH (CG-PUSCH).

Similarly, for the network device, it receives the first indication information sent by the terminal device, and the first indication information is used for determining the sub-bands on the unlicensed carrier that are used for communication, where the unlicensed carrier includes at least two sub-bands, and in specific, the first indication information can be received in the following manners.

In a first manner, a reference signal sent by the network device is received, and the reference signal carries the first indication information.

In a second manner, control information sent by the network device is received, and the control information carries the first indication information.

The specific implementations and meaning thereof correspond to those described above with respect to the terminal device side.

At S202, the network device determines, according to the first indication information, the sub-bands on the unlicensed carrier that are used for transmission of the uplink channel and/or the uplink signal by the terminal device.

After the network device receives the first indication information sent by the terminal device in the above manner, it needs to determine, according to the first indication information, the sub-band(s) for the terminal device to transmit the uplink channel and/or uplink signal, that is, the sub-band(s) for receiving the uplink channel and/or the uplink signal, and the specific determination method differs depending on the contents specifically indicated by the first indication information. The following provides description on how to determine the sub-band(s) for the uplink channel and/or uplink signal transmission according to the first indication information when the first indication information indicates different information. The description is given in an example where the first sub-band includes the sub-bands used for communication in a working bandwidth, the first BWP, of the terminal device, and the second sub-band includes the sub-band(s) not used for communication in the working bandwidth, the first BWP, of the terminal device.

In a first case, the first indication information is used to indicate indices of the sub-bands included in the first sub-band.

Optionally, in an implementation of this solution, a bit mapping manner may be used to indicate the indices of the sub-bands included in the first sub-band. For example, assuming that the first BWP includes N sub-bands, then the first indication information includes N bits, and each bit is used to indicate whether a sub-band is used for communication. For example, when the first BWP includes 4 sub-bands, the first indication information includes 4 bits. For another example, when the first BWP includes 2 sub-bands, the first indication information includes 2 bits. The advantage of this scheme is its simplicity, and the disadvantage is that the signaling overhead is relatively large.

Optionally, restriction on the multi-sub-band adaptive transmission of the NR-U system is that the number of sub-bands actually used for transmission is not less than half of the number of the configured sub-bands. For example, the first BWP on the unlicensed carrier includes N sub-bands, and the number of the sub-bands actually used for transmission on the first BWP is K≥N/2. This restriction can guarantee the performance of the adaptive transmission.

Optionally, the multi-sub-band adaptive transmission of the NR-U system is limited to transmission on one or more sub-bands that are continuous in the frequency domain.

It should be understood that in the multi-sub-band adaptive transmission of the NR-U system, when the sub-bands for which the channel usage right is obtained are less than the sub-bands included in the system carrier, in order for the terminal device to perform the transmission by using part of the sub-bands for which the channel usage right is obtained, the sidebands need to be reserved on both sides of the sub-bands for which the channel usage right is obtained so as to prevent interference to transmissions on the unlicensed spectrum by other systems. For example, assuming that the first BWP includes 4 sub-bands, the terminal device is scheduled to transmit on these 4 sub-bands, and the sub-bands for which the channel usage right is obtained are sub-band 0 and sub-band 2, if the transmission is to be performed through the sub-band 0 and sub-band 2, the sidebands on both sides of sub-band 0 and on both sides of sub-band 2 need to be reserved. If the sub-bands for which the terminal device obtains the channel usage right are the sub-band 1 and sub-band 2, and the transmission is to be performed through the sub-band 1 and sub-band 2, it only needs to reserve the sidebands on one side of sub-band 1 and on the other side of sub-band 2, and it is not necessary to reserve the sideband between the sub-band 1 and sub-band 2. In order to reduce the influence of the reserved sidebands, the multi-sub-band adaptive transmission can be restricted, for example, it is restricted that the continuous partial sub-bands for which the channel usage right is obtained are used as much as possible for transmission. In this case, the states included in the first indication information can be further simplified.

In a second case, the first indication information is used to indicate the sub-band with a smallest index in the first sub-band.

In a specific implementation of the solution, for example, the control information (for example, UCI) is transmitted through the sub-band with the largest index in the first sub-band. The network device can determine the indices of the sub-bands included in the first sub-band from the index of the sub-band on which the control information is received and from the index of the sub-band that is determined according to the first indication information, thereby determining the uplink channel and/or uplink signal transmission bandwidth. For example, the first BWP includes 4 sub-bands, sub-bands 0~3, and the first indication information includes 2 bits. After the channel detection succeeds, the terminal device determines that the sub-bands 1, 2, and 3 are used for communication transmission, and thus the terminal device transmits the UCI to the network device through the sub-band 3, and indicates the sub-band 1 through the first indication information (for example, the bits are represented as 01). The network device can determine that the uplink channel and/or uplink signal transmission bandwidth includes the sub-bands 1, 2, and 3 according to the sub-band 3 on which the UCI is received and according to the sub-band 1 that is determined according to the first indication information.

In a third case, the first indication information is used to indicate the sub-band with a largest index in the first sub-band.

In a specific implementation of the solution, for example, the control information (for example, UCI) can be transmitted through the sub-band with the smallest index in the first sub-band. The network device can determine the indices of the sub-bands included in the first sub-band from the index of the sub-band on which the control information is received and from the index of the sub-band that is determined according to the first indication information, thereby determining the uplink channel and/or uplink signal transmission bandwidth. For example, the first BWP includes 4 sub-bands, sub-bands 0~3, and the first indication information includes 2 bits. After the channel detection succeeds, the terminal device determines that the sub-bands 1, 2, and 3 are used for communication transmission, and thus transmits the UCI to the network device through the sub-band 1, and indicates the sub-band 3 through the first indication information (for example, the bits are represented as 11). The network device can determine that the uplink channel and/or uplink signal transmission bandwidth includes the sub-bands 1, 2, and 3 according to the sub-band 1 on which the UCI is received and according to the sub-band 3 that is determined according to the first indication information.

In a fourth case, the first indication information is used to determine the sub-band with a smallest index in the first sub-band and the number of sub-bands included in the first sub-band.

In a specific implementation of this solution, for example, assuming that the first BWP includes N sub-bands, the index of the sub-band with the smallest index in the first sub-band is S, the number of the sub-bands included in the first sub-band is L, and the value of the first indication information is R, then $R=N*(L-1)+S$ if $(L-1)\leq \text{floor}(N/2)$; otherwise, $R=N*(N-L+1)+(N-1-S)$, where floor means round down, $L\geq 1$ and L is not greater than $N-S$, $0\leq S\leq N-1$.

The number of states included in the first indication information is $N*(N+1)/2$.

For example, the first BWP includes 4 sub-bands, sub-bands 0~3, and the first indication information includes 10 states (values of 0~9). When the value of the first indication information is 5, the network device can determine that the sub-band with the smallest index in the first sub-band is 1 according to the above formula, and that the number of the sub-bands included in the first sub-band is 2, and thus can determine that the uplink channel and/or uplink signal transmission bandwidth includes the sub-bands 1 and 2.

Optionally, the remaining states may be used to indicate a situation where the discontinuous partial sub-bands for which the channel usage right is obtained are used for the transmission. Still in the example where the first BWP includes 4 sub-bands, the first indication information may include 4 bits, indicating 16 states, of which the first 10 states are used to indicate the situation where the continuous partial sub-bands for which the channel usage right is obtained are used for transmission, and the latter six states are used to indicate the situation where the discontinuous partial sub-bands for which the channel usage right is obtained are used for transmission. Further optionally, the case where the discontinuous partial sub-bands for which the channel use right is obtained are used for transmission may include only part of the cases.

It should be understood that in the multi-sub-band adaptive transmission of the NR-U system, it is easier to indicate the sub-bands used for communication in some cases (for example, in the cases where the sub-bands used for communication are continuous sub-bands in the frequency domain), and it is easier to indicate the sub-bands not used for communication in some cases (for example, in the cases where the sub-bands not used for communication are continuous sub-bands in the frequency domain). Therefore, the first indication information may indicate sub-band(s) used for communication in some cases, and indicate the sub-band(s) not used for communication in some other cases. Optionally, the first indication information includes indication information indicating that the first indication information indicates the sub-band(s) used for communication or the sub-band(s) not used for communication, or in other words, the first indication information includes indication information indicating that the first indication information indicates the first sub-band or the second sub-band.

It should be understood that the case where the first indication information includes the indication information of the sub-band(s) not used for communication is similar to the embodiment of the case where the first indication information includes the indication information of the sub-band(s) used for communication, which will not be repeated here.

According to the method for determining the transmission bandwidth provided in the foregoing embodiments, after the network device allocates the resources for the terminal device for transmitting the uplink channel, the terminal device can perform channel detection on each of the sub-bands corresponding to the resources when transmitting the uplink channel and/or the uplink signal, and then determine which sub-band(s) can be used for communication according to the detection result, indicate the same through the first indication information, and send the first indication information to the network device. In this solution, the terminal device sends the first indication information to the network device, so that the network device determines the LBT sub-band(s) actually used for communication among the multiple LBT sub-bands according to the first indication information.

On the basis of the above two embodiments, the method for determining the channel transmission resources according to the present disclosure will be described below through several specific examples in which the network device is a base station and the terminal device is a UE.

Figure 5:
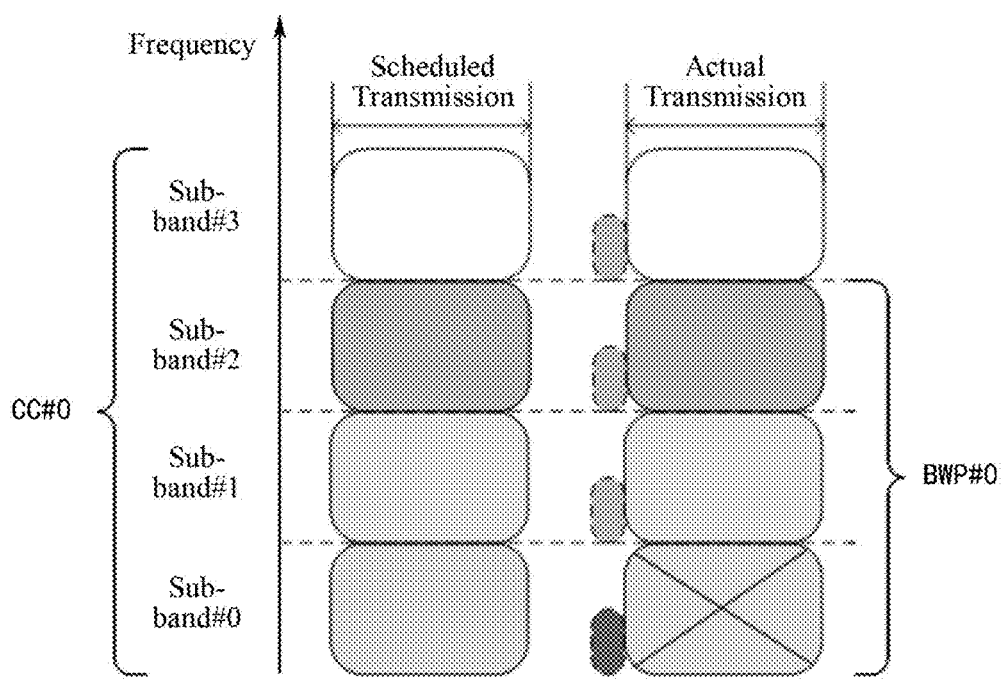
FIG. 5 is a schematic diagram of a network device scheduling downlink channel transmission resources and resources for communication according to an embodiment of the present disclosure.

FIG. 5 is a schematic diagram of a network device scheduling downlink channel transmission resources and resources for communication. As shown in FIG. 5, on the unlicensed carrier, the system bandwidth of the base station is 80 MHz, including 4 sub-bands, sub-bands #0~#3, where the bandwidth of each sub-band is 20 MHz. The base station configures UE with a BWP for channel and signal transmission, where the active BWP #0 has a bandwidth of 60 MHz, including 3 sub-bands, sub-bands #0~#2, and the communication and transmission between the base station and the UE are performed through the BWP #0.

In the downlink channel transmission process, when the base station schedules the UE to receive a PDSCH through the BWP #0, the base station plans to send a PDSCH to the UE through the sub-bands #0~#2 included in the BWP #0. Therefore, the base station performs channel detection on channels of the sub-bands #0~#2, where the base station may perform the channel detection on the sub-band #3 (as shown in FIG. 2, for example, there is downlink transmission by another UE on sub-band #3), or it may not perform the channel detection on the sub-band #3 (for example, there is no demand for data transmission on the sub-band #3), which is not limited in the present disclosure.

After the channel detection ends, the base station determines that the sub-bands #1, #2, and #3 are used for communication, where the first sub-band includes the sub-bands used for communication among the sub-bands included in the unlicensed carrier, that is, the first sub-band includes the sub-bands #1, #2 and #3. According to the method for indicating the start position and the length, the index of the sub-band with the smallest index in the first sub-band is #1, and the number of sub-bands included in the first sub-band is 3. According to the formula R=N*(L−1)+S, it can be determined that the value of the first indication information is 9. Further, the base station determines the corresponding DMRS sequence according to the value of the first indication information, and the DMRS sequence is used to demodulate the PDSCH. Correspondingly, the UE determines the value of the first indication information according to the blind detection of the DMRS sequence, determines, according to the value of the first indication information, that the first sub-band includes the sub-bands #1, #2 , #3, and determines that the sub-bands used for communication in the BWP #0 includes the sub-bands #1 and #2 according to that BWP #0 includes the sub-bands #0, #1, and #2.

In the uplink channel transmission process, when the base station schedules the UE to transmit a PUSCH through a BWP #0, the base station schedules the UE to transmit the PUSCH through sub-bands #0~#2 included in the BWP #0. Therefore, when receiving the scheduling information, the UE performs channel detection on the channels on the sub-bands #0~#2. After the channel detection ends, the UE determines that the sub-bands #1 and #2 are used for communication, where the first sub-band includes the sub-bands used for communication among the sub-bands included in the bandwidth part BWP of the terminal device, that is, the first sub-band includes the sub-bands #1 and #2. The BWP #0 includes 3 sub-bands, and according to the method for indicating the start position and length, the sub-band with the smallest index in the first sub-band is sub-band #1, and the number of sub-bands included in the first sub-band is 2, and thus the base station determines that the value of the first indication information is 4. Further, the UE determines the corresponding DMRS sequence according to the value of the first indication information, and the DMRS sequence is used to demodulate the PUSCH. Correspondingly, the base station determines the value of the first indication information according to the blind detection of the DMRS sequence, determines that the first sub-band includes the sub-bands #1 and #2 according to the value of the first indication information, and determines that the sub-bands used for communication in the BWP #0 include the sub-bands #1 and #2 according to that the BWP #0 includes the sub-band #0, #1 and #2.

Figure 6:
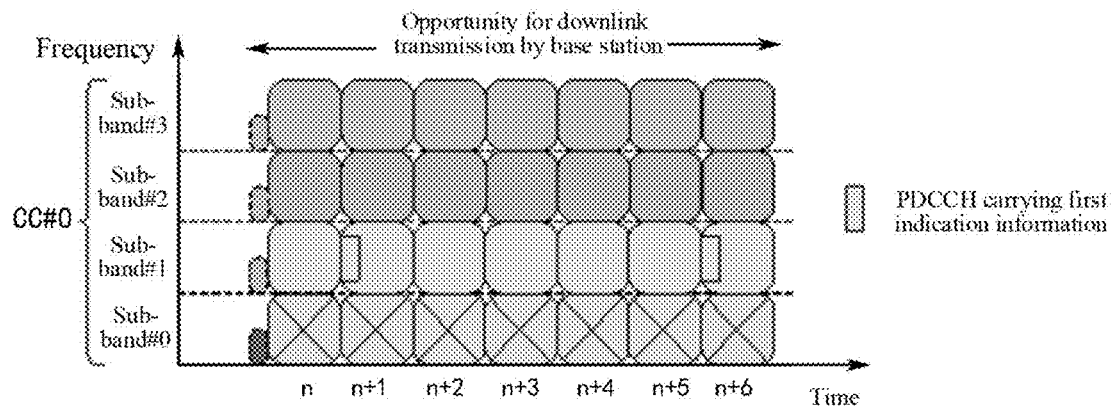
FIG. 6 is another schematic diagram of a network device scheduling downlink channel transmission resources and resources for communication according to an embodiment of the present disclosure.

FIG. 6 is another schematic diagram of a network device scheduling downlink channel transmission resources and resources for communication. As shown in FIG. 6, on an unlicensed carrier, the system bandwidth of the base station is 80 MHz, including 4 sub-bands, sub-band #0~#3, where the bandwidth of each sub-band is 20 MHz. The base station can transmit the PDSCH to the UE through the sub-bands #0~#3.

After the channel detection ends, the base station determines that the channel detection on the sub-bands #1, #2, and #3 is successful, or in other words, the base station determines that the sub-bands #1, #2, and #3 are used for communication in a downlink transmission opportunity of the base station, where the first sub-band includes the sub-bands used for communication among the sub-bands included in the unlicensed carrier, that is, the first sub-band includes the sub-bands #1, #2, and #3. According to the method for indicating the start position and length, the sub-band with the smallest index in the first sub-band is sub-band #1, and the number of sub-bands included in the first sub-band is 3. Therefore, the base station determines that the value of the first indication information is 9. Further, the base station determines the corresponding DMRS sequence according to the value of the first indication information, and the DMRS sequence is used to demodulate the PDSCH.

In addition, the base station also sends the first indication information to the UE through the PDCCH, that is, sending the first indication information in combination with the reference signal and the control information. The PDCCH is sent periodically. In an example, the period of the PDCCH is 5.

Correspondingly, for a UE that is scheduled for PDSCH transmission, the UE determines the value of the first indication information according to the blind detection of the DMRS sequence, determines that the first sub-band includes the sub-bands #1, #2 and #3 according to the value of the first indication information, and performs PDSCH reception according to the sub-bands included in the first sub-band. For a UE that is not scheduled for the PDSCH transmission, the UE may obtain the first indication information by receiving the PDCCH that is periodically sent, so as to determine the sub-band(s) used for communication in the current downlink transmission opportunity.

On the basis of the above embodiments, the present disclosure provides methods on how the terminal device or network device determines the LBT sub-band(s) actually used for communication among multiple LBT sub-bands included in the BWP on the unlicensed carrier when the active BWP of the terminal device includes the multiple LBT sub-bands and supports LBT sub-band adaptive transmission. The primary inventive concept includes that the network device sends indication information to the terminal device so that the terminal device can determine, according to the indication information, the LBT sub-band(s) actually used for communication among the multiple LBT sub-bands included in the BWP, or the terminal device sends the indication information to the network device, so that the network device can determine, according to the indication information, the LBT sub-band(s) actually used for communication among the multiple LBT sub-bands of the terminal device, and then performs channel transmission on the corresponding sub-band(s), which solves the problem in the related art that the network device cannot notify the UE of the LBT sub-band(s) used for PDSCH transmission, effectively improves the transmission efficiency and avoids problems such as transmission failure due to that the transmission resources cannot be determined.

Figure 7:
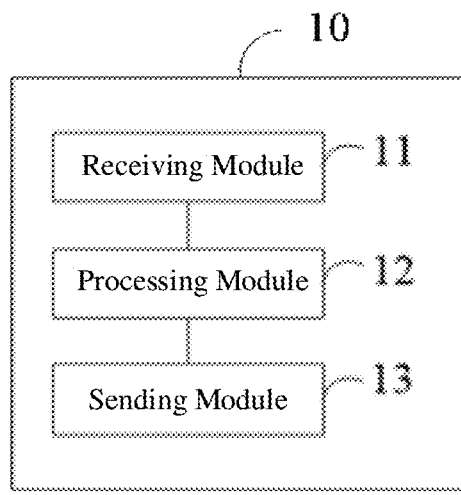
FIG. 7 is a schematic structural diagram of a first embodiment of a terminal device according to the present disclosure.

FIG. 7 is a schematic structural diagram of a first embodiment of a terminal device according to the present disclosure. As shown in FIG. 7, the network device 10 includes a receiving module 11 configured to receive first indication information sent by a network device, the first indication information being used for determining sub-bands used for communication on an unlicensed carrier, wherein the unlicensed carrier includes at least two sub-bands; and a processing module 12 configured to determine, according to the first indication information, one or more sub-bands on the unlicensed carrier that are used for transmission of a downlink channel and/or downlink signal by the network device.

The terminal device according to this embodiment is used to perform the technical solution on the terminal device side in any of the foregoing method embodiments, and the implementation principles and technical effects thereof are similar. The network device sends the first indication information to the terminal device, so that the terminal device can determine the LBT sub-band(s) actually used for communication among the multiple LBT sub-bands according to the first indication information.

On the basis of the above embodiment, the receiving module 11 is specifically configured to receive a reference signal sent by the network device, where the reference signal carries the first indication information; and determine the first indication information according to the reference signal.

Optionally, the reference signal includes at least one of the following: a DMRS for PDSCH demodulation; a DMRS for PDCCH demodulation; a DMRS for PBCH demodulation; and a CSI-RS.

Optionally, the reference signal carrying the first indication information includes an initialization parameter generated by a sequence of the reference signal being determined according to the first indication information.

Optionally, the reference signal carrying the first indication information includes a length of a sequence of the reference signal being determined according to the first indication information.

Optionally, the receiving module 11 is specifically configured to receive a PDCCH sent by the network device, the PDCCH including the first indication information; and determine the first indication information according to the PDCCH.

Optionally, the PDCCH including the first indication information includes at least one of the following situations where DCI transmitted in the PDCCH includes the first indication information; CRC corresponding to the PDCCH is determined according to the first indication information; and a RNTI for scrambling the PDCCH is determined according to the first indication information.

Optionally, the PDCCH includes at least one of the following situations where the PDCCH is scrambled according to a RNTI common to a cell; the PDCCH is scrambled according to the RNTI common to a group; and the PDCCH is scrambled according to the RNTI specific to the terminal device.

Optionally, the first indication information includes at least one of the following information: an index of each sub-band included in a first sub-band, where the first sub-band includes sub-bands used for communication among the sub-bands included in an unlicensed carrier or sub-bands used for communication among the sub-bands included in a first bandwidth part (BWP) of the terminal device; a sub-band with a smallest index in the first sub-band; a sub-band with a largest index in the first sub-band; a number of sub-bands included in the first sub-band; an index of each sub-band included in a second sub-band, where the second sub-band includes sub-bands not used for communication among the sub-bands included in the unlicensed carrier or sub-bands not used for communication among the sub-bands included in the first BWP of the terminal device; a sub-band with a smallest index in the second sub-band; a sub-band with a largest index in the second sub-band; a number of sub-bands included in the second sub-band; and first identification information for indicating that the first indication information indicates the first sub-band or the second sub-band.

The terminal device provided in any of the foregoing embodiments is used to implement the foregoing technical solution on the terminal device side in the downlink channel and/or downlink signal transmission process, and the implementation principles and technical effects thereof are similar, which will not be repeated here.

The terminal device also includes a sending module, and in the uplink channel and/or uplink signal transmission process, the sending module 13 is configured to send first indication information to the network device, the first indication information being used for the network device to determine one or more sub-bands on the unlicensed carrier which are used for transmission of an uplink channel and/or uplink signal by the terminal device, where the unlicensed carrier includes at least two sub-bands.

In a specific implementation of this solution, the sending module 13 is specifically configured to send a reference signal to the network device, where the reference signal carries the first indication information.

Optionally, the reference signal includes at least one of the following signals: a DMRS for PUSCH demodulation, or a SRS.

Optionally, the reference signal carrying the first indication information includes:

an initialization parameter generated by a sequence of the reference signal being determined according to the first indication information.

Optionally, a sequence length of the reference signal is determined according to the first indication information.

In a specific implementation of this solution, the sending module 13 is specifically configured to send the PUCCH from the terminal device to the network device, where the PUCCH includes the first indication information.

Optionally, the PUCCH includes UCI.

Based on any of the foregoing implementations, the first indication information includes at least one of the following information: an index of each sub-band included in a first sub-band, where the first sub-band includes sub-bands used for communication among the sub-bands included in an unlicensed carrier or sub-bands used for communication among the sub-bands included in a first bandwidth part (BWP) of the terminal device; a sub-band with a smallest index in the first sub-band; a sub-band with a largest index in the first sub-band; a number of sub-bands included in the first sub-band; an index of each sub-band included in a second sub-band, where the second sub-band includes sub-bands not used for communication among the sub-bands included in the unlicensed carrier or sub-bands not used for communication among the sub-bands included in the first BWP of the terminal device; a sub-band with a smallest index in the second sub-band; a sub-band with a largest index in the second sub-band; a number of sub-bands included in the second sub-band; and first identification information for indicating that the first indication information indicates the first sub-band or the second sub-band.

The terminal device provided in any of the foregoing embodiments is used to implement the foregoing technical solution on the terminal device side in the uplink channel and/or uplink signal transmission process, and the implementation principles and technical effects thereof are similar, which will not be repeated here.

Figure 8:
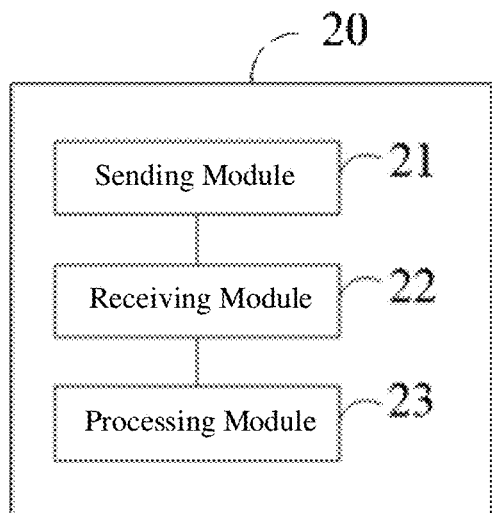
FIG. 8 is a schematic structural diagram of a first embodiment of a network device according to the present disclosure.

FIG. 8 is a schematic structural diagram of a first embodiment of a network device according to this disclosure. As shown in FIG. 8, the network device 20 includes a sending module 21 configured to send first indication information to a terminal device, the first indication information being used for the terminal device to determine one or more sub-bands on an unlicensed carrier that are used for transmission of a downlink channel and/or a downlink signal by the network device, wherein the unlicensed carrier includes at least two sub-bands.

The sending module 21 is specifically configured to send a reference signal to the terminal device, where the reference signal carries the first indication information.

Optionally, the reference signal includes at least one of the following: a DMRS for PDSCH demodulation; a DMRS for PDCCH demodulation; a DMRS for PBCH demodulation; and a CSI-RS.

Optionally, the reference signal carrying the first indication information includes an initialization parameter generated by a sequence of the reference signal being determined according to the first indication information.

Optionally, the reference signal carrying the first indication information includes a length of a sequence of the reference signal being determined according to the first indication information.

Optionally, the sending module 21 is specifically configured to send a PDCCH to the terminal device, where the PDCCH includes the first indication information.

Optionally, the PDCCH including the first indication information includes at least one of the following situations where DCI transmitted in the PDCCH includes the first indication information; CRC corresponding to the PDCCH is determined according to the first indication information; and a RNTI for scrambling the PDCCH is determined according to the first indication information.

Optionally, the PDCCH includes at least one of the following situations where the PDCCH is scrambled according to a RNTI common to a cell; the PDCCH is scrambled according to the RNTI common to a group; and the PDCCH is scrambled according to the RNTI specific to the terminal device.

Optionally, the first indication information includes at least one of the following information: an index of each sub-band included in a first sub-band, where the first sub-band includes sub-bands used for communication among the sub-bands included in an unlicensed carrier or sub-bands used for communication among the sub-bands included in a first bandwidth part (BWP) of the terminal device; a sub-band with a smallest index in the first sub-band; a sub-band with a largest index in the first sub-band; a number of sub-bands included in the first sub-band; an index of each sub-band included in a second sub-band, where the second sub-band includes sub-bands not used for communication among the sub-bands included in the unlicensed carrier or sub-bands not used for communication among the sub-bands included in the first BWP of the terminal device; a sub-band with a smallest index in the second sub-band; a sub-band with a largest index in the second sub-band; a number of sub-bands included in the second sub-band; and first identification information for indicating that the first indication information indicates the first sub-band or the second sub-band.

The network device provided in the foregoing embodiment is used to perform the technical solution on the terminal device side in the downlink channel and/or downlink signal transmission process in any of the foregoing method embodiments, and the implementation principles and technical effects thereof are similar, which will not be repeated here.

The network device also includes a receiving module 22 and a processing module 23. In the process of the uplink channel and/or uplink signal transmission, the receiving module 22 is configured to receive the first indication information sent by the terminal device, the first indication information being used for determining the sub-bands for communication on the unlicensed carrier, where the unlicensed carrier includes at least two sub-bands.

The processing module 23 is configured to determine, according to the first indication information, the sub-bands on the unlicensed carrier that are used for transmission of the uplink channel and/or uplink signal by the terminal device.

On the basis of the foregoing implementations, the receiving module 22 is further configured to receive a reference signal sent by the terminal device, where the reference signal carries the first indication information; and the processing module 23 is further configured to determine the first indication information according to the reference signal.

Optionally, the reference signal includes a DMRS for PUSCH demodulation, and/or a SRS.

Optionally, the reference signal carrying the first indication information includes an initialization parameter generated by a sequence of the reference signal being determined according to the first indication information.

Optionally, a sequence length of the reference signal is determined according to the first indication information.

Optionally, the receiving module 22 is further configured to receive a PUCCH sent by the terminal device, where the PUCCH includes the first indication information; and the processing module 23 is further configured to determine the first indication information according to the PUCCH.

Optionally, the PUCCH includes UCI information.

Based on any of the foregoing implementations, the first indication information includes at least one of the following information: an index of each sub-band included in a first sub-band, where the first sub-band includes sub-bands used for communication among the sub-bands included in an unlicensed carrier or sub-bands used for communication among the sub-bands included in a first bandwidth part BWP of the terminal device; a sub-band with a smallest index in the first sub-band; a sub-band with a largest index in the first sub-band; a number of sub-bands included in the first sub-band; an index of each sub-band included in a second sub-band, where the second sub-band includes sub-bands not used for communication among the sub-bands included in the unlicensed carrier or sub-bands not used for communication among the sub-bands included in the first BWP of the terminal device; a sub-band with a smallest index in the second sub-band; a sub-band with a largest index in the second sub-band; a number of sub-bands included in the second sub-band; and first identification information for indicating that the first indication information indicates the first sub-band or the second sub-band.

The network device provided in the foregoing embodiment is used to perform the technical solution on the network device side in the uplink channel and/or uplink signal transmission process in any of the foregoing method embodiments, and the implementation principles and technical effects thereof are similar, which will not be repeated here.

Figure 9:
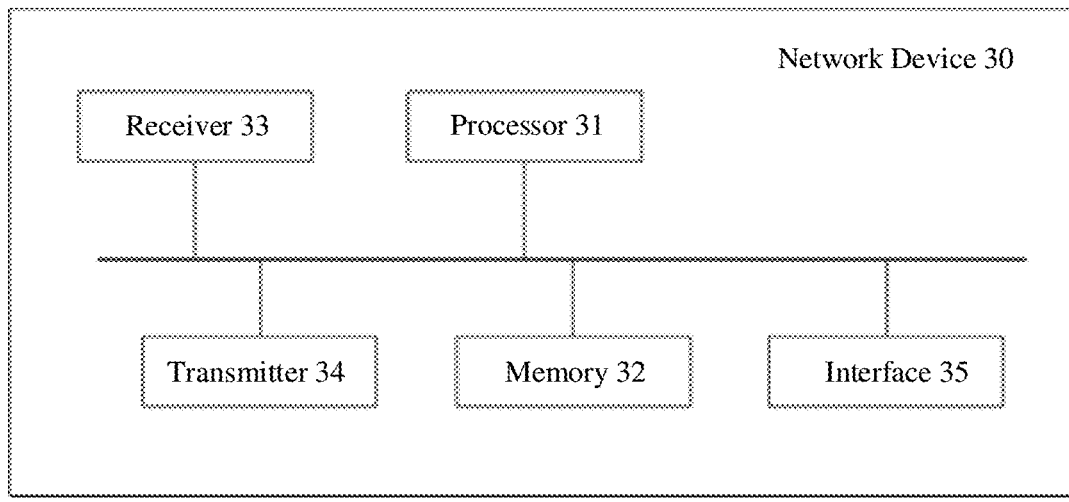
FIG. 9 is a schematic structural diagram of a second embodiment of a network device according to the present disclosure.

FIG. 9 is a schematic structural diagram of a second embodiment of a network device according to this disclosure. As shown in FIG. 9, the network device 30 includes a processor 31, a memory 32, a receiver 33, a transmitter 34 and an interface 35 for communication with a terminal device, wherein the memory 32 stores computer-executable instructions, the processor 31 executes the computer-executable instructions stored in the memory, to cause the processor 31 to perform the technical solution on the network device side according to any of the foregoing method embodiments.

Figure 10:
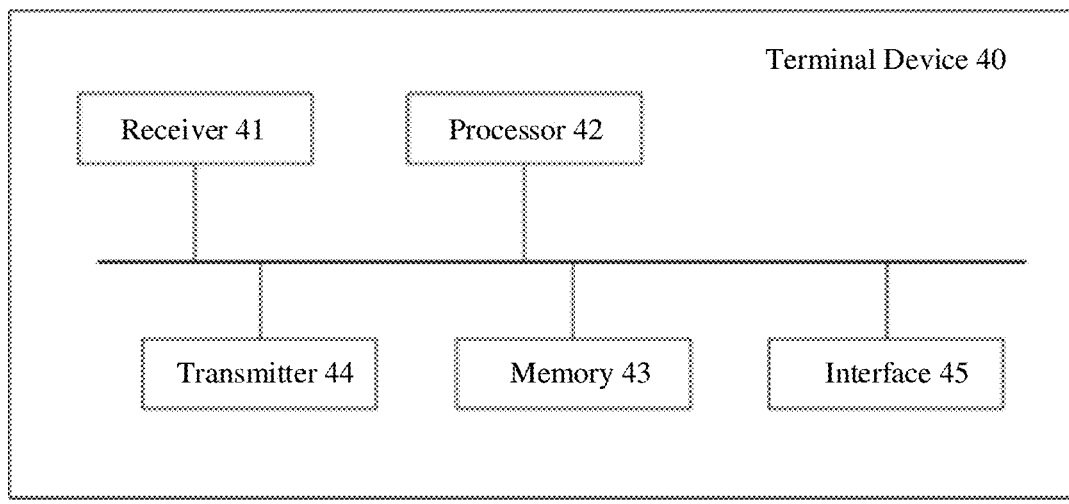
FIG. 10 is a schematic structural diagram of a second embodiment of a terminal device according to the present disclosure.

FIG. 10 is a schematic structural diagram of a second embodiment of a terminal device according to this disclosure. As shown in FIG. 10, the terminal device 40 includes a processor 42, a memory 43, a transmitter 44 and an interface 45 for communication with a network device, and optionally, the terminal device 40 further includes a receiver 41.

The memory 43 stores computer-executable instructions.

The processor 42 executes the computer-executable instructions stored in the memory, to cause the processor 42 to perform the technical solution on the terminal device side according to any of the foregoing method embodiments.

The present disclosure also provides a computer-readable storage medium having stored thereon computer-executable instructions which, when being executed by a processor, are used to implement the technical solution on the terminal device side in any of the foregoing method embodiments.

The present disclosure also provides a computer-readable storage medium having stored thereon computer-executable instructions which, when being executed by a processor, are used to implement the technical solution on the network device side in any of the foregoing method embodiments.

The embodiments of the present disclosure also provide a program which, when being executed by a processor, is used to perform the technical solutions on the terminal device side in the foregoing method embodiments.

The embodiments of the present disclosure also provide a program which, when being executed by a processor, is used to perform the technical solutions on the network device side in the foregoing method embodiments.

The embodiments of the present disclosure also provide a computer program product, including program instructions which are used to implement the technical solutions on the terminal device side in the foregoing method embodiments.

The embodiments of the present disclosure also provide a computer program product, including program instructions which are used to implement the technical solutions on the network device side in the foregoing method embodiments.

The embodiments of the present disclosure also provide a chip including a processing module and a communication interface, and the processing module can perform the technical solutions on the terminal device side in the foregoing method embodiments.

Further, the chip also includes a storage module (such as a memory), the storage module is configured to store instructions, the processing module is configured to execute the instructions stored in the storage module, and the execution of the instructions stored in the storage module causes the processing module to perform the technical solutions on the terminal device side.

The embodiments of the present disclosure also provide a chip including a processing module and a communication interface, and the processing module can perform the technical solutions on the network device (the base station) in the foregoing method embodiments.

Further, the chip also includes a storage module (such as a memory), the storage module is configured to store instructions, the processing module is configured to execute the instructions stored in the storage module, and the execution of the instructions stored in the storage module causes the processing module to perform the technical solutions on the network device side.

It should be understood that the systems, devices, and methods disclosed in several embodiments of the present disclosure can be implemented in other manners. For example, the device embodiments described above are merely illustrative. For example, the division of the units is only a logical function division, and in actual implementations, there can be other division manners. For example, a plurality of units or components can be combined or integrated into another system, or some features can be ignored or not implemented. In addition, the coupling or direct coupling or communication connection shown or discussed herein can also be indirect coupling or communication connection through some interfaces, devices or units, and can be in electrical, mechanical or other forms.

In the above specific implementations of the user device and network device, it should be understood that the processor may be a Central Processing Unit (CPU), or any other general-purpose processor, Digital Signal Processor (DSP), Application Specific Integrated Circuit (ASIC), etc. The general-purpose processor may be a microprocessor, or the processor may also be any conventional processor or the like. The steps of the method disclosed in this disclosure may be directly embodied as being performed by a hardware processor, or performed by a combination of hardware and software modules in the processor.

All or part of the steps in the foregoing method embodiments can be implemented by a program instruction relevant hardware. The aforementioned program can be stored in a readable memory. The program, when being executed, causes to perform the steps in the foregoing method embodiments; and the foregoing memory (storage medium) includes a read-only memory (ROM), a RAM, a flash memory, a hard disk, a solid-state hard disk, a magnetic tape, a floppy disk, an optical disc and any combination thereof.

What is claimed is:

1. A method for determining a transmission bandwidth, comprising:
    sending, by a network device to a terminal device, first indication information used for the terminal device to determine one or more sub-bands on an unlicensed carrier that are used for communication, wherein the unlicensed carrier comprises at least two sub-bands, the first indication information is used to determine the sub-band with a smallest index in a first sub-band and a number of sub-bands included in the first sub-band, and the first sub-band comprises sub-bands used for communication among the sub-bands comprised in a first bandwidth part (BWP) of the terminal device.

2. The method according to claim 1, wherein the method further comprises:
    sending, by the network device, a PDCCH to the terminal device, the PDCCH comprising the first indication information.

3. A non-transitory computer-readable storage medium, configured to store a computer program, wherein the computer program causes a computer to perform operations comprising:
    sending first indication information to a terminal device, the first indication information being used for the terminal device to determine one or more sub-bands on an unlicensed carrier that are used for communication, wherein the unlicensed carrier comprises at least two sub-bands, the first indication information is used to determine the sub-band with a smallest index in a first sub-band and a number of sub-bands included in the first sub-band, and the first sub-band comprises sub-bands used for communication among the sub-bands comprised in a first bandwidth part (BWP) of the terminal device.

4. The storage medium according to claim 3, wherein the operations further comprise sending a PDCCH to the terminal device, the PDCCH comprising the first indication information.

* * * * *